May 31, 1927.
W. M. SCOTT ET AL
1,630,908
ELECTRICAL MEASURING INSTRUMENT
Original Filed Jan. 7, 1922  2 Sheets-Sheet 1
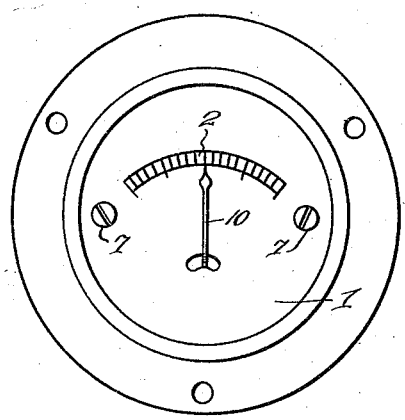
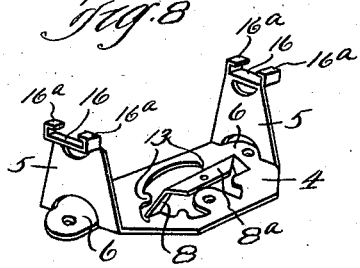
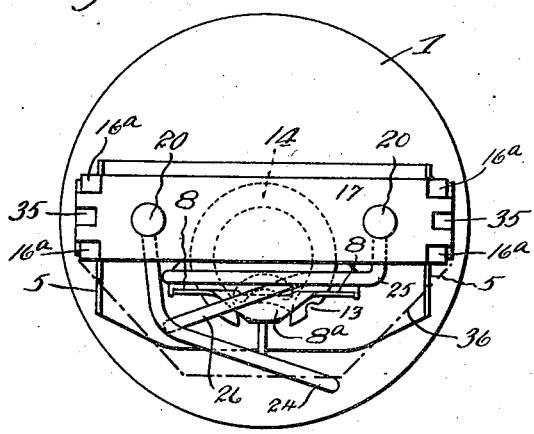
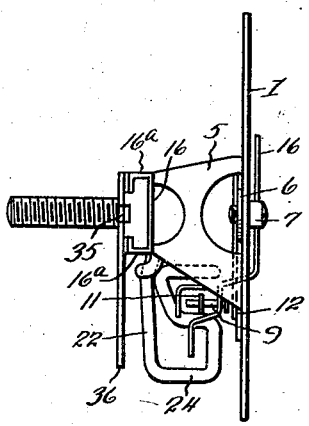
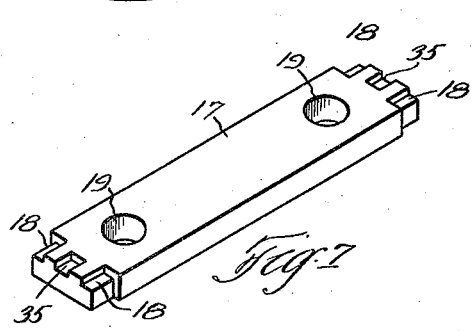
Inventors
Walter M. Scott and
Raleigh E. Trevor
By Hull, Broch & Wells
Attys.

May 31, 1927.
W. M. SCOTT ET AL
1,630,908
ELECTRICAL MEASURING INSTRUMENT
Original Filed Jan. 7, 1922 2 Sheets-Sheet 2
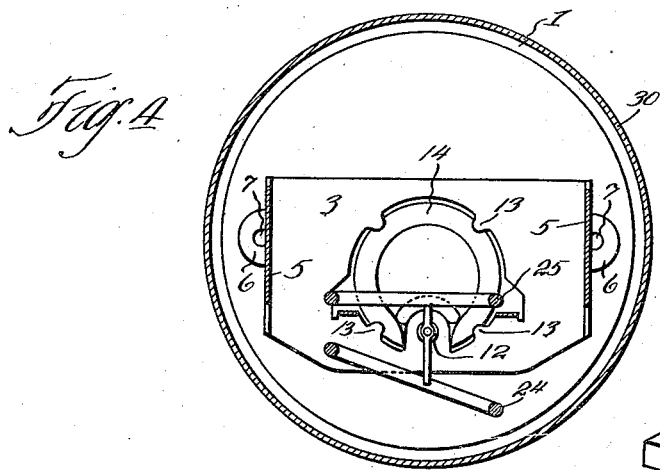
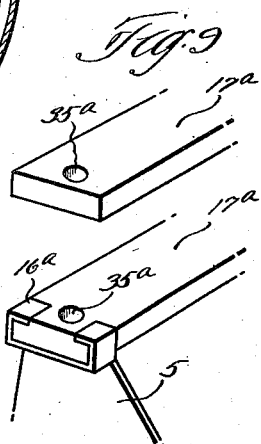
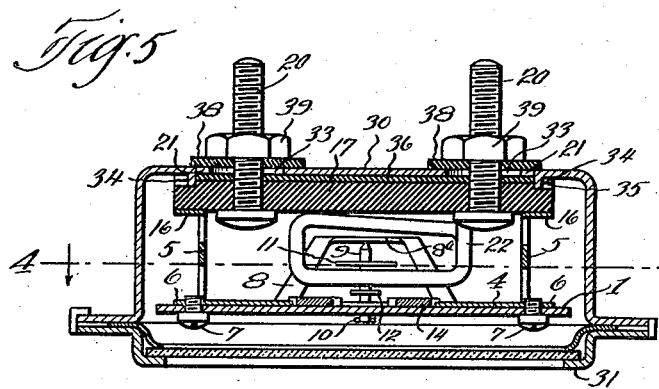
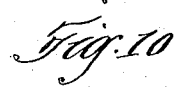
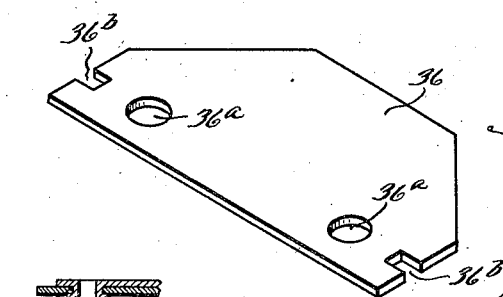
Inventors
Walter M. Scott and
Raleigh E. Tresner
By Hull Brock & West
Attys.

Patented May 31, 1927.

1,630,908

UNITED STATES PATENT OFFICE.

WALTER M. SCOTT AND RALEIGH E. TRESISE, OF CLEVELAND, OHIO.

ELECTRICAL MEASURING INSTRUMENT.

Original application filed January 7, 1922, Serial No. 527,552. Divided and this application filed February 8, 1924. Serial No. 691,385.

This invention relates to electrical measuring instruments and has particular reference to an ammeter of the type used on self propelled vehicles for indicating the rate of flow of current to and from the starting and lighting battery.

The principal object of the present invention is to provide an instrument of this character which shall consist of a minimum number of parts which are simple in construction, inexpensive to manufacture and easily and quickly assembled.

Another object is to provide an instrument of this character which shall be rugged and capable of withstanding the extreme vibrations to which such instruments are subjected and yet be capable of indicating accurately the rate of current flow to and from the battery.

A still further object is to provide an ammeter which shall be so constructed and assembled as to reduce to a minimum the possibility of incurring a short circuit therein.

With these various objects in view and others which will become apparent as the description proceeds, the invention consists in the novel features of construction and in the manner of combining or arranging the same, all of which will be fully described hereinafter and pointed out in the appended claims.

In the accompanying drawing, Fig. 1 is a front elevation of our improved ammeter; Fig. 2 is a rear elevation of the assembled operating mechanism of the ammeter and showing the same removed from the casing; Fig. 3 is a side elevation of the parts shown in Fig. 2; Fig. 4 is a sectional view taken on the line 4—4 of Fig. 5; Fig. 5 is a central transverse sectional view through the instrument shown in Fig. 1; Fig. 6 is a perspective view of one of the elements entered into the construction of the instrument; Fig. 7 is a perspective view of the insulating bridge employed in our instrument; Fig. 8 is a perspective view of a supporting member forming part of the instrument; Figs. 9 and 10 are details in perspective of a modified manner of supporting the bridge from the frame and casing; and Fig. 11 is a detail in section showing a modified manner of fastening the dial to the base.

Describing by reference characters the various parts illustrated, 1 indicates a dial in the form of a circular disk which is preferably formed from sheet metal and provided on one face thereof with a calibrated scale, indicated at 2. Secured to this disk, on the rear side thereof, is a sheet metal supporting member 3 which is shown in detail in Fig. 8. This supporting member comprises a base 4 having an arm 5 projecting upwardly therefrom at each end. Each arm is provided with an ear 6 stamped therefrom, said ears lying in the plane of the base 4 and receiving screws 7 which fasten the supporting member to the disk, the disk constituting a base for said member. A support 8 is struck up from the base 4, the upper portion of said support being bent over parallel with the base, as shown at $8^a$, the base and the part $8^a$ serving to receive and pivotally support the staff 9 of an indicating needle 10. The staff 9 has mounted thereon an armature 11 and a damping device 12, said damping device being located in or adjacent to a point of high concentration of a permanent magnet field which tends to resist rapid and vibratory movement of the needle and the armature 11 being spaced from said damping device and located in the maximum field of a current coil to be referred to hereinafter. The opening in the base, formed by punching the needle support therefrom, is enlarged slightly and is provided about its periphery with a plurality of clips 13 enabling the permanent magnet 14 to be inserted into said opening from the under side of the base and to be retained in position by the clips 13, when the parts are assembled.

The upper end of each arm 5 is bent over parellel with the base to form a shelf 16, which shelves receive an insulating bridge 17, the ends $16^a$ of each shelf being bent upwardly and inwardly to form clips entering recesses 18 formed in the said bridge (see Figs. 3, 11 and 12) thereby to secure said bridge to the said arms. The insulating bridge is provided with two apertures 19 arranged in spaced relationship and adapted to receive terminal screws 20 which are preferably provided with anchoring fins 21 (see Fig. 5) to prevent rotation thereof when said screws are pressed into the said apertures, the fins forming their own seats in the insulating material of the bridge, which may be of fibre or other insulation. These screws serve as terminals for the meter and the ends of a current coil 22 are connected thereto in any suitable manner, as by soldering.

The current coil preferably consists of a convolution 24 and a convolution 25 spaced apart and connected by an intermediate portion 26, the convolutions 24 and 25 being spaced apart and arranged substantially as shown. It will be noted that the permanent magnet 14, current coil 22, and the movable system comprising the staff 9, needle 10, armature 11 and damping device 12 are grouped and arranged so that the current coil lies wholly to one side of the permanent magnet with its field parallel to the magnet face and substantially perpendicular to a line joining the magnet poles. Also the staff 9 is mounted so as to intersect the current coil and its axis is perpendicular to the field of said coil and to the plane of the magnet. This arrangement as previously stated, positions the damping device 12 between or adjacent the magnet poles, or in or adjacent the point of high concentration of the permanent magnet field, and also positions the armature 11 in the maximum field of the current coil and out of the maximum field of the permanent magnet, which causes a more nearly equal effect by the two fields than has heretofore been accomplished in instruments of this type, and a more uniform scale is obainable together with remarkable accuracy.

The dial, supporting member, and associated parts, forming an assembly such as shown in Figs. 2 and 3, are next placed in a casing. This casing is composed of a rear portion 30 and a front portion 31 having a transparent pane positioned therein. The rear portion 30 is provided with two enlarged apertures 33 through which the terminal screws 20 project loosely, and an inwardly directed tongue 34 is punched from the casing adjacent to and intersecting the periphery of each aperature 33. The tongues 34 are adapted to enter aligning recesses 35, 35 in the insulating bridge (Fig. 7) as clearly shown in Fig. 5, and thus position the terminals 20 centrally with respect to the apertures 33. This arrangement also prevents the movement of the terminals with respect to the casing and hence prevents the rear portion of the casing from contacting electrically with the assembly positioned therein, due to the large air gap provided around each terminal.

Before the assembly is positioned in the rear portion of the casing, an apron 36 (Fig. 6) of insulating material is slipped over the terminals 20 and into contact with the insulating bridge, having apertures 36ᵃ for the reception of said terminals, and end recesses 36ᵇ for the reception of the tongues 34. This apron makes "shorting" impossible between the clips 16ᵃ and the casing and between the coil and the casing, even should the coil become displaced, as by violent treatment, or by overheating, in such a manner as to touch the base or (but for such apron) to touch the back of the casing. When the complete assembly has been positioned in the rear portion of the casing, and the tongues 34 are entered in the recesses 36ᵇ and 35, as previously described, then an insulating washer 38 is slipped over each terminal and into contact with the casing, after which a nut 39 is applied to each terminal to draw the parts up tightly. Any suitable transparent front may be applied to the rear portion of the casing, as for example, a front similar to that disclosed in our co-pending application Serial No. 527,552, filed January 7, 1922.

In Figs. 9 and 10 there is shown a modified manner of holding the insulating bridge and of centering the same with respect to the apertures 33 in the back of the casing. In these views, the bridge 17ᵃ is made of relatively soft or yielding insulating material, such as fiber, and is provided with holes 35ᵃ, which may be bored therethrough, for the reception of the tongues 34. Because of the material of which the bridge is formed, no side recesses need be pre-formed in the ends thereof, but the ends of the clips 16ᵃ are pressed into the sides of the ends so as to be substantially flush with the top and the sides of the bridge. This reduces the cost of mounting and assembling.

In Fig. 11 there is shown a modified manner of supporting the disk from the base 4. Instead of using screws 7 integral heads 7ᵃ are struck from the base and project into holes 7ᵇ in the disk, the heads being spread out, as by means of a center punch, so that the sides of the heads will engage the side walls of the cooperating holes or apertures, thereby to secure the disk to the base.

Having thus described our invention, what we claim is:—

1. In an apparatus of the character set forth, the combination, with a disk, of a supporting member for said disk, an insulating bridge carried by said supporting member, a needle support projecting from said supporting member, a permanent magnet upon said supporting member, a movable system journaled between said needle support and said supporting member, a pair of terminals carried by said bridge, and a current coil having the ends thereof electrically connected to said terminals and disposed in operative relation to said movable system.

2. In an apparatus of the character set forth, the combination, with a base, of a pair of arms projecting from said base, an insulating bridge carried by said arms, a support overhanging said base, a movable system journaled between said support and said base, a permanent magnet interposed between said support and said base and having the poles thereof disposed in operative relation to said movable system, a pair of terminals carried by said bridge, and a current coil having the ends thereof electrically connected to said terminals and disposed in operative relation to said movable system.

3. In an apparatus of the character set forth, the combination, with a disk, of a supporting member for said disk and having a pair of arms projecting upwardly from said member, an insulating bridge carried by said arms, a needle support formed integral with and projecting from the base of said member, a movable system journaled between said needle support and said base, a permanent magnet interposed between said disk and said base and having the poles thereof disposed in operative relation to said movable systems, a pair of terminals carried by said insulating bridge, and a current coil having the ends thereof electrically connected to said terminals and disposed in operative relation to said movable system.

4. In an apparatus of the character set forth, the combination with a meter assembly including a dial and a supporting member secured thereto, of an insulating bridge carried by said member and having a pair of terminals projecting therefrom, a casing adapted to receive said assembly and provided with a pair of enlarged apertures adapted to receive said terminals loosely therethrough, and means carried by said casing and adapted to engage said bridge to center said terminals in said apertures.

5. In an apparatus of the character set forth, the combination, with a meter assembly including a disk and a supporting member carried thereby, of a bridge carried by said member and having a pair of terminals projecting therefrom, a casing adapted to receive said assembly, said casing being provided with a pair of enlarged apertures adapted to receive said terminals loosely therethrough, and a plurality of tongues projecting from said casing and engaging said bridge to center said terminals with respect to said apertures.

6. A sheet metal supporting member for an instrument of the character set forth comprising a base, a pair of arms projecting therefrom, a needle support struck from said base and extending therefrom, the outer end of said needle support being bent over parallel with said base, said base being provided with an aperture therein for receiving a permanent magnet, and means associated with said base for retaining said magnet in said aperture.

7. The combination, with a base, of a pair of arms projecting therefrom, a needle support struck from said base and extending therefrom, the outer end of said needle support being bent over parallel with said base, said base being provided with an aperture therein for receiving a permanent magnet, means associated with said base for retaining said magnet in said aperture, a bridge secured to said arms, and a pair of terminals carried by said bridge.

In testimony whereof, we hereunto affix our signatures.

WALTER M. SCOTT.
RALEIGH E. TRESISE.